United States Patent [19]
Baker et al.

[11] Patent Number: 6,159,272
[45] Date of Patent: Dec. 12, 2000

[54] HYDROGEN RECOVERY PROCESS

[75] Inventors: Richard W. Baker, Palo Alto; Kaaeid A. Lokhandwala, Union City; Zhenjie He, Fremont; Ingo Pinnau, Palo Alto, all of Calif.

[73] Assignee: Membrane Technology and Research, Inc., Menlo Park, Calif.

[21] Appl. No.: 09/316,507

[22] Filed: May 21, 1999

Related U.S. Application Data

[63] Continuation-in-part of application No. 09/083,775, May 22, 1998, Pat. No. 5,980,609, which is a continuation-in-part of application No. 08/789,376, Jan. 24, 1997, Pat. No. 5,785,739, which is a continuation-in-part of application No. 08/780,868, Jan. 24, 1997, Pat. No. 5,755,855.

[51] Int. Cl.[7] .............................. B01D 53/22; B01D 53/04
[52] U.S. Cl. ....................................... 95/39; 95/50; 95/96
[58] Field of Search .................... 95/39, 45, 49, 95/50, 52, 90, 96, 263, 266

[56] References Cited

U.S. PATENT DOCUMENTS

| | | | |
|---|---|---|---|
| 3,303,105 | 2/1967 | Konikoff et al. | 95/52 X |
| 4,362,613 | 12/1982 | MacLean | 208/108 |
| 4,367,135 | 1/1983 | Posey, Jr. | 208/108 |
| 4,370,150 | 1/1983 | Fenstermaker | 55/16 |
| 4,548,619 | 10/1985 | Steacy | 55/16 |
| 4,553,983 | 11/1985 | Baker | 62/18 |
| 4,654,063 | 3/1987 | Auvil et al. | 62/18 |
| 4,836,833 | 6/1989 | Nicholas et al. | 55/16 |
| 4,857,078 | 8/1989 | Watler | 55/16 |
| 4,892,564 | 1/1990 | Cooley | 55/16 |
| 4,906,256 | 3/1990 | Baker et al. | 55/16 |
| 4,963,165 | 10/1990 | Blume et al. | 55/16 |
| 4,994,094 | 2/1991 | Behling et al. | 55/16 |
| 5,032,148 | 7/1991 | Baker et al. | 55/16 |
| 5,053,067 | 10/1991 | Chretien | 62/24 |
| 5,069,686 | 12/1991 | Baker et al. | 55/16 |
| 5,082,481 | 1/1992 | Barchas et al. | 62/23 |
| 5,089,033 | 2/1992 | Wijmans | 55/16 |
| 5,127,926 | 7/1992 | Baker et al. | 55/16 |

(List continued on next page.)

OTHER PUBLICATIONS

H. Yamashiro et al., "Hydrogen Purification With Cellulose Acetate Membranes," presented at the Europe–Japan Congress on Membranes and Membrane Processes, Jun. 18–21, 1987.

W.A. Bollinger et al., "Prism™ Separators Optimize Hydrocracker Hydrogen," presented at AIChE 1983 Summer National Meeting, Session No. 66, Aug. 29, 1983.

H. Yamashiro et al., "Plant Uses Membrane Separation," Hydrocarbon Processing, Feb. 1985.

W.A. Bollinger et al., "Optimizing Hydrocracker Hydrogen," Chemical Engineering Progress, May 1984.

J.M. Abrado et al., "Hydrogen Technologies to Meet Refiners' Future Needs," Hydrocarbon Processing, Feb. 1985.

"Polymeric Gas Separation Membranes," Paul and Yampolski (eds.).

"Membrane Technology for Hydrocarbon Separation," Membrane Associates Ltd.

*Primary Examiner*—Robert H. Spitzer
*Attorney, Agent, or Firm*—J Farrant

[57] ABSTRACT

A treatment process for a hydrogen-containing off-gas stream from a refinery, petrochemical plant or the like. The process includes three separation steps: condensation, membrane separation and hydrocarbon fraction separation. The membrane separation step is characterized in that it is carried out under conditions at which the membrane exhibits a selectivity in favor of methane over hydrogen of at least about 2.5.

20 Claims, 7 Drawing Sheets

U.S. PATENT DOCUMENTS

| | | | |
|---|---|---|---|
| 5,157,200 | 10/1992 | Mikkinen et al. | 585/803 |
| 5,199,962 | 4/1993 | Wijmans | 55/16 |
| 5,205,843 | 4/1993 | Kaschemekat et al. | 55/16 |
| 5,281,255 | 1/1994 | Toy et al. | 95/50 |
| 5,332,424 | 7/1994 | Rao et al. | 95/47 |
| 5,354,547 | 10/1994 | Rao et al. | 423/650 |
| 5,374,300 | 12/1994 | Kaschemekat et al. | 95/39 |
| 5,435,836 | 7/1995 | Anand et al. | 95/45 |
| 5,447,559 | 9/1995 | Rao et al. | 423/650 |
| 5,452,581 | 9/1995 | Dinh et al. | 62/24 |
| 5,501,722 | 3/1996 | Toy et al. | 95/50 |
| 5,507,856 | 4/1996 | Rao et al. | 95/50 |
| 5,634,354 | 6/1997 | Howard et al. | 62/624 |
| 5,669,958 | 9/1997 | Baker et al. | 95/50 |
| 5,689,032 | 11/1997 | Krause et al. | 585/802 |
| 5,755,855 | 5/1998 | Baker et al. | 95/39 |
| 5,785,739 | 7/1998 | Baker | 95/39 |
| 5,964,923 | 10/1999 | Lokhandwala | 95/39 X |
| 5,980,609 | 11/1999 | Baker et al. | 95/39 |

HYDROGEN RECOVERY PROCESS

This application is a continuation-in-part of Ser. No. 09/083,775, filed May 22, 1998, now U.S. Pat. No. 5,980, 609, issued Nov. 9, 1999, which is a continuation-in-part of Ser. No. 08/789,376, filed Jan. 24, 1997, now U.S. Pat. No. 5,785,739, issued Jul. 28, 1998 and Ser. No. 08/780,868, filed Jan. 24, 1997, now U.S. Pat. No. 5,755,855, issued May 26, 1998, all of which are incorporated herein by reference in their entirety.

This invention was made in part with Government support under SBIR award number DE-FG03-98ER82618 awarded by the Department of Energy. The Government has certain rights in this invention.

FIELD OF THE INVENTION

The invention relates to treatment of gas streams containing hydrogen and light hydrocarbons. In particular, the invention relates to treatment of such streams by means of a rubbery polymeric separation membrane.

BACKGROUND OF THE INVENTION

Many different streams containing mixtures of hydrogen and light hydrocarbons, such as $C_1$–$C_6$ hydrocarbons, are generated during oil refining and petrochemical manufacture.

Over the years, economic pressures have driven refiners to attempt to convert even the heaviest fraction of the crude oil to gasoline components, fuel oils and petrochemical feedstocks. For example, hydrocracking is widely used to break down aromatic cycle oils, coker distillates and other relatively heavy feeds and reconstitute them as diesel fuels, kerosene or naphtha. This process is a heavy consumer of hydrogen, using perhaps 1,000–2,000 scf/barrel of feedstock cracked, and yields streams from which it is very desirable to recover as much hydrogen as possible for reuse. Separation of the raw stream leaving the reactors is typically carried out by flashing off hydrogen, followed by various stripping and fractionation steps as appropriate. Nevertheless, considerable amounts of hydrogen are not recaptured and pass to the fuel gas line with unrecovered light hydrocarbons.

Likewise, demand for low-sulfur products has increased, and refineries are reaching or have reached the point at which they can consume more hydrogen in desulfurization and related hydrotreating than they can produce from catalytic reforming. For example, desulfurization of middle distillates typically consumes about 600 scf of hydrogen per barrel of treated feed; for vacuum gas oil this number rises to about 800 scf/bbl and for atmospheric residue to about 1,000 scf/bbl.

Other representative processes carried out in refineries or petrochemical plants that can give rise to streams containing some hydrogen include catalytic cracking, catalytic reforming, delayed coking, distillate dewaxing, aromatics production, alkylation, isomerization, hydrogenation and dehydrogenation, and olefin production. Hydrogen-containing streams also arise from unsaturated and saturated gas plants used to treat and fractionate pooled off-gases from the various unit operations.

These many sources give rise to diverse streams from which it is currently not cost effective to carry out further hydrogen recovery, and, in general, these gases are simply used as fuel within the plant. Yet these streams range in volume flow from less than 1 MMscfd up to 20 MMscfd or more, and contain from less than 1% hydrogen to more than 70% hydrogen. Furthermore, many streams also contain high percentages, such as 10%, 20%, 30% or more, of $C_{3+}$ hydrocarbons. The chemical value of these individual components is much higher—in some instances, as much as eight times higher—than their fuel value. The ability to recover at least some of this value would be advantageous, especially in refineries, which generally operate at narrow financial margins.

Separation of certain gas mixtures by means of selective membranes has been known to be possible for many years, and membrane-based gas separation systems are emerging to challenge conventional separations technology in a number of areas. That membranes have the potential to separate organic vapors from other gases is also known. For example, U.S. Pat. Nos. 4,553,983; 4,857,078; 4,963,165; 4,906,256; 4,994,094; 5,032,148; 5,069,686; 5,127,926; 5,281,255 and 5,501,722 all describe membranes, systems or processes suitable for such separations. Likewise, it has been recognized that condensation and membrane separation may be combined, as is shown in U.S. Pat. Nos. 5,089,033; 5,199, 962; 5,205,843 and 5,374,300.

The use of certain polymeric membranes to treat off-gas streams in refineries is described in the following papers: "Hydrogen Purification with Cellulose Acetate Membranes", by H. Yamashiro et al., presented at the Europe-Japan Congress on Membranes and Membrane Processes, June 1984; "Prism™ Separators Optimize Hydrocracker Hydrogen", by W. A. Bollinger et al., presented at the AIChE 1983 Summer National Meeting, August 1983; "Plant Uses Membrane Separation", by H. Yamashiro et al., in Hydrocarbon Processing, February 1985; and "Optimizing Hydrocracker Hydrogen" by W. A. Bollinger et al., in Chemical Engineering Progress, May 1984. These papers describe system designs using cellulose acetate or similar membranes that permeate hydrogen and reject hydrocarbons. The use of membranes in refinery separations is also mentioned in "Hydrogen Technologies to Meet Refiners' Future Needs", by J. M. Abrardo et al. in Hydrocarbon Processing, February 1995. This paper points out the disadvantage of membranes, namely that they permeate the hydrogen, thereby delivering it at low pressure, and that they are susceptible to damage by hydrogen sulfide and heavy hydrocarbons.

A chapter in "Polymeric Gas Separation Membranes", D. R. Paul et al. (Eds.) entitled "Commercial and Practical Aspects of Gas Separation Membranes", by Jay Henis describes various hydrogen separations that can be performed with hydrogen-selective membranes.

Hydrogen recovery techniques including membrane separation for use in refinery operations are described in many patents. U.S. Pat. No. 4,362,613, to Monsanto, describes a process for treating the vapor phase from a high pressure separator in a hydrocracking plant by passing the vapor across a membrane that is selectively permeable to hydrogen. The process yields a hydrogen-enriched permeate that can be recompressed and recirculated to the hydrocracker reactor. U.S. Pat. No. 4,367,135, also to Monsanto, describes a process in which effluent from a low pressure separator is treated to recover hydrogen using the same type of hydrogen-selective membrane. U.S. Pat. No. 4,548,619, to UOP, shows membrane treatment of the overhead gas from an absorber treating effluent from benzene production. The membrane again permeates the hydrogen selectively and produces a hydrogen-enriched gas product that is withdrawn from the process. U.S. Pat. No. 5,053,067, to L'Air Liquide, discloses removal of part of the hydrogen from a refinery off-gas to change the dewpoint of the gas to facilitate downstream treatment. U.S. Pat. No. 5,082,481, to Lummus Crest, describes removal of carbon dioxide, hydrogen and water vapor from cracking effluent, the hydrogen separation being accomplished by a hydrogen-selective membrane. U.S. Pat. No. 5,157,200, to Institut Francais du Petrole, shows treatment of light ends containing hydrogen and light hydrocarbons, including using a hydrogen-selective membrane to separate hydrogen from other components. U.S. Pat. No. 5,689,032, to Krause/Pasadyn, discusses a method for separating hydrogen and hydrocarbons from refinery off-gases, including multiple low-temperature condensation steps and a membrane separation step for hydrogen removal.

Literature from Membrane Associates Ltd., of Reading, England, shows and describes a design for pooling and downstream treating various refinery off-gases, including passing of the membrane permeate stream to subsequent treatment for LPG recovery.

Other references that describe membrane-based separation of hydrogen from gas streams in a general way include U.S. Pat. No. 4,654,063, U.S. Pat. No. 4,836,833, to Air Products, and U.S. Pat. No. 4,892,564, to Cooley.

U.S. Pat. No. 5,332,424, to Air Products, describes fractionation of a gas stream containing light hydrocarbons and hydrogen using an "adsorbent membrane". The membrane is made of carbon, and selectively adsorbs hydrocarbons onto the carbon surface, allowing separation between various hydrocarbon fractions to be made. Hydrogen tends to be retained in the membrane residue stream. Other Air Products patents that show application of carbon adsorbent membranes to hydrogen/hydrocarbon separations include U.S. Pat. No. 5,354,547; U.S. Pat. No. 5,435,836; U.S. Pat. No. 5,447,559 and U.S. Pat. No. 5,507,856, which all relate to purification of streams from steam reformers. U.S. Pat. No. 5,634,354, to Air Products, discloses removal of hydrogen from hydrogen/olefin streams. In this case, the membrane used to perform the separation is either a polymeric membrane selective for hydrogen over hydrocarbons or a carbon adsorbent membrane selective for hydrocarbons over hydrogen.

U.S. Pat. No. 4,857,078, to Watler, mentions that, in natural gas liquids recovery, streams that are enriched in hydrogen can be produced as retentate by a rubbery membrane.

The use of rubbery polymeric membranes operated at low temperature to separate methane from nitrogen is taught in U.S. Pat. No. 5,669,958.

A reference that shows condensation to remove hydrocarbons upstream of a membrane separation step in a refinery is U.S. Pat. No. 5,452,581, to Dinh et al. Effluent from an ethylene manufacturing operation is cooled to a temperature below 0° C., such as −30° C. to −50° C., before passing the remaining stream to a hydrogen-selective membrane. Interestingly, in this case, the membrane is specifically used to raise the dewpoint of the remaining stream to facilitate subsequent cryogenic condensation.

SUMMARY OF THE INVENTION

The invention is a process adapted for treating an off-gas stream from a refinery, petrochemical plant, natural gas processing plant, or similar facility. A principal goal of the process is to produce an upgraded hydrogen product stream from a gas stream containing a mixture of at least hydrogen, methane and other light hydrocarbons. The invention includes three separation steps: cooling/condensation, membrane separation and hydrocarbon fraction separation.

In a basic embodiment, the process of the invention includes the following steps:

(a) cooling the off-gas stream, resulting in partial condensation of the stream, thereby dividing the stream into a condensed portion enriched in $C_{3+}$ hydrocarbon and an uncondensed portion enriched in hydrogen;

(b) passing the uncondensed portion as a feed stream to a membrane separation unit, the membrane separation unit containing a rubbery polymeric membrane having a feed side and permeate side, and being selectively permeable to methane over hydrogen, under conditions sufficient that the membrane exhibits a methane/hydrogen selectivity of at least about 2.5;

(c) withdrawing from the permeate side a permeate stream enriched in methane and $C_{3+}$ hydrocarbon compared with the vapor phase;

(d) withdrawing from the feed side a hydrogen-enriched product gas;

(e) passing the condensed portion to a hydrocarbon separation step for separation of a $C_{3+}$ hydrocarbon fraction and a lighter hydrocarbon fraction from the condensed portion.

To applicants' knowledge, such an integrated combination of steps has not previously been used for this type of separation.

The process relies on obtaining a methane/hydrogen selectivity of at least about 2.5, more preferably at least about 3, and most preferably at least about 4, in the membrane separation step. This selectivity, which has hitherto been unknown in any membrane material, is achieved in the preferred case by using a polysiloxane membrane, particularly a silicone rubber membrane. The ability of such a membrane to produce such a comparatively high methane/hydrogen selectivity at low temperature and in the presence of one or more $C_{3+}$ hydrocarbons is unexpected and very advantageous in terms of obtaining three useful product streams from the process. Furthermore, under these conditions the membrane exhibits extremely high selectivity for other hydrocarbons over hydrogen, such as 10 or more for ethane/hydrogen and 30 or more for propane/hydrogen.

The condensation step is most preferably carried out at a pressure no greater than about 500 psig and a temperature no lower than about −40° C.

The hydrocarbon fraction separation step can be carried out by flashing, distillation, or any other suitable technique.

All of the unit separation operations may be performed as single-stage operations, or may be themselves carried out in multiple sub-steps. It is also possible to carry out an additional condensation step on the $C_{3+}$ hydrocarbon-enriched membrane permeate stream, or to carry out the membrane separation step upstream of the condensation step, so that the condensation step is performed on the membrane permeate stream.

Our process has an important advantage over other membrane separation processes that have been used in the industry in the past: all hydrocarbons, including methane, permeate the membrane preferentially, leaving a residue stream on the feed side that is concentrated in the slower-permeating hydrogen. This means that the hydrogen product stream is delivered at high pressure. Since one goal of the separation is often to create a source of hydrogen for use in the plant or elsewhere, the ability to deliver this hydrogen without the need for recompression is attractive.

Also as a result of the preferential hydrocarbon permeation, the membrane separation step can produce streams that are significantly colder, such as 10° C., 20° C. or more colder, than the membrane feed stream. These streams can be used to provide cooling for the condensation step. In another aspect, therefore, the invention includes heat integration steps that can, in favorable cases, provide all or most of the cooling capacity required for condensation.

Since polymeric materials are used for the membranes, they are relatively easy and inexpensive to prepare and to house in modules, compared with other types of hydrogen-rejecting membranes, such as finely microporous inorganic membranes, including adsorbent carbon membranes, pyrolysed carbon membranes and ceramic membranes.

The membranes used in the present invention permeate heavier hydrocarbons and hydrogen sulfide and are capable of withstanding exposure to these materials even in comparatively high concentrations. This contrasts with cellulose acetate and like membranes, which must be protected from exposure to heavy hydrocarbons.

Specific exemplary separations to which the process of the invention can be applied include, but are not limited to, separation of light hydrocarbons from hydrogen in off-gas streams from: hydrocrackers; hydrotreaters of various kinds, including hydrodesulfurization units; catalytic crackers; coking reactors; catalytic reformers; specific isomerization, alkylation and dealkylation units; steam reformers; hydrogenation and dehydrogenation processes; and steam crackers for olefin production.

Most significantly, the invention provides membrane processes that can separate methane from hydrogen with a practical, industrially useful selectivity, and retain the hydrogen at high pressure.

It is to be understood that the above summary and the following detailed description are intended to explain and illustrate the invention without restricting its scope.

DETAILED DESCRIPTION OF THE INVENTION

Figure 1:
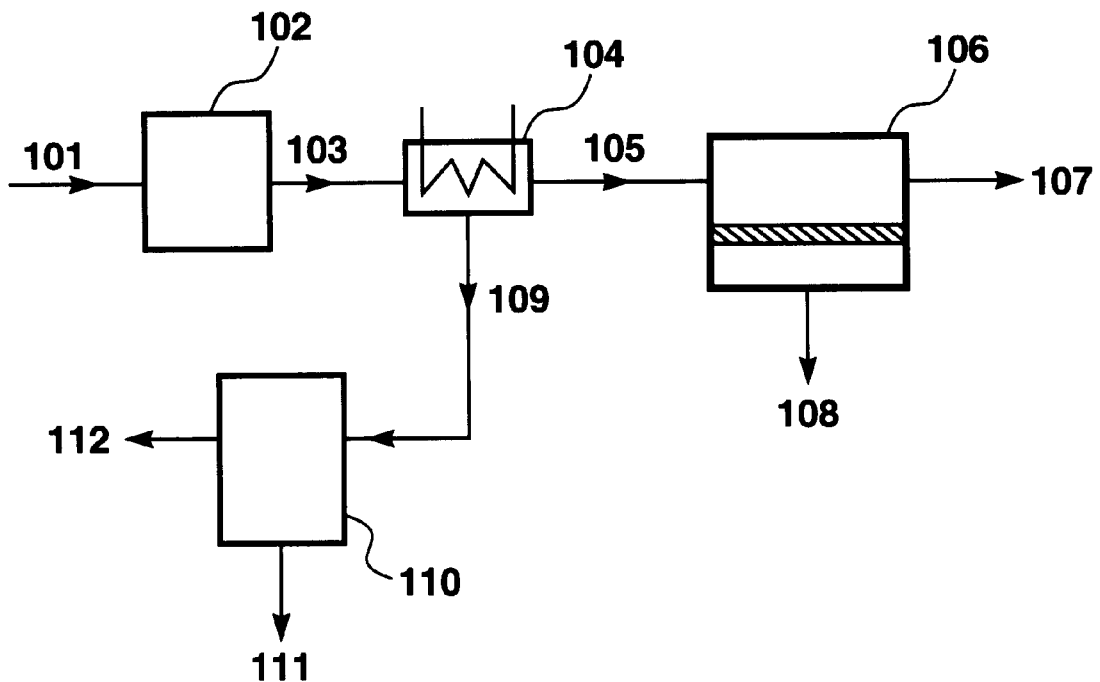
FIG. 1 is a schematic drawing showing a basic embodiment of the invention.

The term gas as used herein means a gas or a vapor.

The term $C_{2+}$ hydrocarbon means a hydrocarbon having at least two carbon atoms; the term $C_{3+}$ hydrocarbon means a hydrocarbon having at least three carbon atoms; and so on.

The term $C_{2-}$ hydrocarbon means a hydrocarbon having no more than two carbon atoms; the term $C_{3-}$ hydrocarbon means a hydrocarbon having no more than three carbon atoms; and so on.

The term light hydrocarbon means a hydrocarbon molecule having no more than about six carbon atoms.

The term lighter hydrocarbons means $C_1$ or $C_2$ hydrocarbons.

The term heavier hydrocarbons means $C_{3+}$ hydrocarbons.

The term off-gas stream means a stream leaving an operation or set of operations in a refinery, petrochemical plant, natural gas processing plant, or any other facility producing mixtures of hydrogen and light hydrocarbons. An off-gas stream may be an intermediate stream that is passing from one processing step to another in the facility. Examples include streams from desulfurization steps that will be passed to reformers or catalytic crackers, or gas streams that will be passed to the unsaturated or saturated gas plants. An off-gas stream may also be a waste gas stream that is to be used as fuel or discharged. Examples include overhead streams from various columns in the saturated and unsaturated gas plants, from other distillation columns, and from strippers and splitters. Petrochemical off-gases include, for example, those generated by the production of butadiene by the Houdry process, production of ethanol from methanol, production of benzene from toluene, and production of styrene from ethylbenzene.

Percentages herein are by volume unless otherwise stated.

The invention is a process for treating an off-gas stream as defined above. One goal of the process is to produce an upgraded hydrogen product stream from a gas stream containing a mixture of at least hydrogen and light hydrocarbons. A second goal is to produce a useful $C_{3+}$ hydrocarbon stream. A third goal is to reduce the amounts of hydrogen and $C_{3+}$ hydrocarbons sent to the fuel gas line.

Frequently, the process of the invention will result in four streams: a hydrogen product stream, a $C_{3+}$ hydrocarbons stream, also known as LPG (liquid petroleum gas), and two methane-rich streams (the membrane permeate stream and the hydrocarbon fractionation step overhead stream), which may be used for fuel.

The invention includes three separation steps: cooling/condensation, membrane separation and hydrocarbon fraction separation. The process is shown in a typical basic embodiment in FIG. 1. Turning now to this figure, hydrocarbon stream, 101, is subjected to any operation, indicated by box 102, that produces an off-gas stream 103, that contains hydrogen and multiple light hydrocarbons, such as a mixture of $C_1$–$C_6$ hydrocarbons. The operation indicated by box 102 may be hydrotreating, catalytic reforming, catalytic cracking, hydrocracking, etc., or combinations of unit operations, identified more specifically below. Stream 103 passes through heat exchanger or chiller, 104, resulting in formation of a condensed stream, 109, containing hydrocarbons, but also containing some dissolved hydrogen, and an uncondensed stream, 105, still containing some uncondensed hydrocarbons.

The condensed stream or condensate, 109, then passes to hydrocarbon fraction separation step 110, which can be carried out by flashing or distilling the condensate, for example. This step produces a light overhead fraction 112, containing mostly methane, ethane and any remaining hydrogen, and a liquid fraction 111, containing mostly $C_{3+}$ hydrocarbons.

The uncondensed stream, 105, is fed to a membrane separation unit, 106. The membrane unit contains a hydrogen-rejecting membrane, that is a membrane that is selective for all hydrocarbons over hydrogen. The membrane is a rubbery polymeric membrane, preferably polysiloxane, and the membrane separation step is carried out under conditions that provide a methane/hydrogen selectivity of at least about 2.5, more preferably at least about 3, and most preferably at least about 4. Frequently, a pressure difference between the feed and permeate sides of the membrane large enough to provide sufficient driving force for transmembrane permeation may be provided because operation 102 produces an off-gas stream at high pressure compared to atmospheric, such as 100 psig, 200 psig, 300 psig or more. If the off-gas stream is not at sufficient pressure, additional driving force can be provided by compressing stream 103 or by connecting a vacuum pump on the permeate side of the membrane, so that permeate stream 108 is under partial vacuum. The membrane unit produces two streams, a residue stream, 107, and a permeate stream, 108. The residue stream, 107, is the hydrogen product stream. This stream can optionally be subjected to a further separation step, such as pressure swing adsorption (PSA) to recover a higher purity hydrogen product. After further purification, if necessary, the hydrogen product stream can be used as a feedstock in the facility or for other purposes as desired.

The permeate stream, 108, which is enriched in hydrocarbon content compared with membrane feed stream, 105, can be recirculated within the process of the invention, used as fuel or treated within the facility, or sent elsewhere for further treatment or use.

Each of the steps is now discussed in more detail.

The goal of the cooling/condensation step is twofold: one, to condense part of the $C_{3+}$ hydrocarbons content of stream 103 to produce an LPG or liquefied light hydrocarbon product, and two, to facilitate the subsequent membrane separation step and downstream recycle or treatment. The amount of $C_{3+}$ hydrocarbon that can be removed from the gas stream in this way will depend on the boiling points, the concentration in the feed, and the operating conditions under which the condensation is performed.

The condensation step involves chilling alone or, commonly, compression and chilling. Compressing the gas raises the dewpoint temperature, so a combination of compression and chilling is generally preferred. In some cases, operation 102 may be such that stream 103 is already at high pressure, such as above 100 or 200 psig for example. In this case, chilling alone may suffice to induce condensation.

It is desirable to avoid very high pressures and very low temperatures, since reaching these conditions adds to the cost and complexity of the process. By very high pressures, we mean pressures in excess of about 1,000 psig, or about 60 atm. The pressure at which the condensation step is operated should preferably be in the range below about 1,000 psig, more preferably below about 500 psig, and most preferably below about 250 psig.

By very low temperatures, we mean temperatures below about –100° C. The temperature at which the condensation step is operated should be above –100° C., and most preferably above about –40° C. Temperatures down to about the bottom of the preferred range should be possible to reach by single-stage refrigeration, for example using propylene as the cooling refrigerant. Cost savings can often be achieved by cooling in stages. As a purely representative example, a fan cooler may be employed to reduce the incoming stream temperature to 30–40° C., followed by heat exchange against chilled plant water to lower the temperature to 10–15° C., and finally heat exchange against the membrane permeate stream or a refrigerant stream. The temperature at which the condensation step functions is typically higher than could be used for recovery by compression/condensation alone. For example, good recovery of even ethylene may be had at temperatures well above –100° C. This is a significant operational advantage.

The degree of cooling to which the gas is subjected depends to some extent on the gas composition. The invention relies on obtaining a methane/hydrogen selectivity of at least about 2.5 in the membrane separation step. Such a selectivity is currently unknown from any membrane material at temperatures above 0° C. Unexpectedly, however, as discussed in more detail below with regard to the membrane separation step, we have found that a methane/hydrogen selectivity of 2.5, 3, or even 4 or more can be obtained from a silicone rubber membrane exposed to a stream containing hydrogen, methane and a $C_{3+}$ hydrocarbon at sub-zero temperatures. Thus, the preferred operating range for the condensation step is between 0° C. and –40° C.

The fraction of hydrocarbons remaining in the condenser vent gas after the condensation step depends on the vapor/liquid equilibrium at the operating conditions under which the condensation step is performed. Since the boiling point of, for example, ethylene at 1 atm pressure is about –104° C., staying within the confines of the preferred ranges stated above would be difficult, or impossible, if good separation of hydrocarbons were to be accomplished by condensation alone. However, since the process of the invention does not rely on condensation alone, useful levels of separation can be achieved under the above-defined modest temperature and pressure conditions. For example, suppose the condensation step removes only 50% of the $C_{3+}$ hydrocarbon content of the feed gas. If the condensation step is followed by a membrane separation step that can remove 80% of the hydrocarbon reaching it, then the total removal obtained is 90%. If the condensation step removes 80%, and is followed by a membrane separation step that also removes 80%, then the total removal is 96%. If the condensation step removes 80% and the membrane separation step 90%, the total removal is 98%.

In the practice of the invention, therefore, it is preferable only that the condensation step be designed to remove at least about 50% of the $C_{3+}$ hydrocarbon content present in the feed to the condenser, more preferably, at least about 70%. Operation under extreme conditions to achieve 90% or more removal during condensation is unnecessary, because the process does not rely on condensation alone to achieve the overall separation.

The most preferred goal of the process is to separate two useful product streams from the off-gas stream: the hydrogen gas stream exiting as the high-pressure residue from the membrane separation step and the $C_{3+}$ hydrocarbon stream exiting as the bottom stream from the hydrocarbon fraction separation step. Typically, there will be composition targets for each stream. For example, the hydrogen stream might be required to contain no more than 40%, 30%, 20%, 10%, 5% or less total hydrocarbons, depending on its destination, and the hydrocarbon product stream 111 might be required to contain no more than 5%, 1% or less of hydrogen, and/or of the $C_1$ and $C_2$ hydrocarbons. Depending on the original composition of the mixture, this may mean 50%, 80%, 90% or 99%, for example, removal of hydrogen from hydrocarbons, or vice versa, coupled with 5-fold, 10-fold, 100-fold or 1,000-fold enrichment of the other stream.

If the gas stream contains water vapor, two chillers in series may optionally be used. The first chiller is maintained at a temperature above, but close to, 0° C., and removes most of the entrained water. The second chiller is maintained at the lower temperature necessary to remove a substantial fraction of the higher-boiling components. Some water vapor will inevitably pass into the second chiller but the use of the first chiller will significantly reduce the need for defrosting the second. Alternatively, the condensation step may include another type of dehydration process through which the gas stream passes before it enters the condenser.

For simplicity, the condenser or chiller in FIG. 1 is identified by a single box, 104, from which the condensate liquid and remaining gas are shown emerging as discrete streams. It will be appreciated that, in practice, the condenser will often comprise a chiller, which produces a gas/liquid mixture, and a phase separator, in which the phases are separated and from which they are withdrawn as discrete streams. The same comment applies to the other figures herein.

Turning now to the hydrocarbon fraction separation step, this may be carried out by any appropriate technique. Preferred techniques are flash evaporation and distillation. Typically, flashing is achieved by letting down the pressure of the liquid to be flashed, thereby achieving essentially instantaneous conversion of a portion of the liquid to the gas phase. This may be done by passing the liquid through an expansion valve into a receiving tank or chamber, or any other type of phase separation vessel, for example. The released gas can be drawn off from the upper part of the chamber; the remaining liquid can be withdrawn from the bottom. We prefer to carry out the flash evaporation by pressure release alone, since this is simple and convenient. We believe, also, that in general better removal of the lower-boiling gases is usually obtainable per unit pressure change than per unit temperature change.

Alternatively, flash evaporation can be achieved by sending the liquid to a vessel and raising the temperature, while maintaining the pressure at its previous value, or by a combination of pressure lowering and heating. Those of skill in the art will appreciate that the decision as to which method to use in any specific set of circumstances should be determined taking into account the environment in which the process is to be carried out, and the relative importance of product purity, operating costs and other factors.

During the flash step, it is preferred to bring the condensate to a condition a little above the saturation vapor pressure of the $C_2$ hydrocarbons at that temperature. This controls loss of $C_{2+}$ hydrocarbons into the gas phase. By a little above the saturation vapor pressure, we mean most preferably about 0–50 psig above the saturation vapor pressure at the flashing temperature. The amounts and compositions of the flashed gas and the product liquid depend on the changes of pressure and temperature to which the condensate is subjected. Generally, the results are very close to a theoretical one-stage evaporation step and can be calculated to good reliability from tabulated thermodynamic data. The energy taken to evaporate the flash gas results in a significant lowering of the temperature of the remaining liquid, such as 10° C., 20° C. or more. If desired, this liquid may be used to cool the incoming stream, such as by running against the incoming stream in heat exchanger or chiller, 104. However, this will necessitate lowering the pressure of the stream, which is often required at high pressure for subsequent fractionation operations, so is not preferred.

Optionally, flashing may be carried out in two or more stages, such as by lowering the pressure incrementally. This type of operation produces several gas streams at different pressures. By removing at least a portion of the gas at high pressure, the cost of compression of the remainder is reduced.

Depending on the environment in which the process is operating and the destinations of the hydrocarbons, it can be preferred to perform the hydrocarbon fraction separation step by distillation to remove the $C_1$ and $C_2$ components from the $C_{3+}$ fraction as an overhead product. For example, in many refinery operations, it is desirable to send the $C_{2-}$ components to the fuel gas line and retain the $C_{3+}$ components as a condensed liquid. A deethanizer column, as is well known in the art, can then be used to fractionate the condensate to achieve this result. In some cases, such as in treating off-gas from fluid catalytic cracking (FCC) or delayed coking, the gas can contain significant amounts of low molecular weight olefins, typically ethylene and propylene, which it is desired to separate from the light paraffins. For this application, it is often preferable to perform the hydrocarbon fraction separation step by feeding stream 109 first to a demethanizer column, as is well known in the art, so that overhead stream 112 contains methane and hydrogen, and bottom stream 111 contains the $C_{2+}$ fraction, then treating stream 111 to separate the $C_2$ and $C_3$ fractions and/or the olefins from the paraffins.

In some applications, the volume of liquid produced in the condensation step may be too small to justify a dedicated unit to perform the hydrocarbon fractionation step. In this case stream 109 may be pooled with streams from other sources for the performance of this step.

Figure 2:
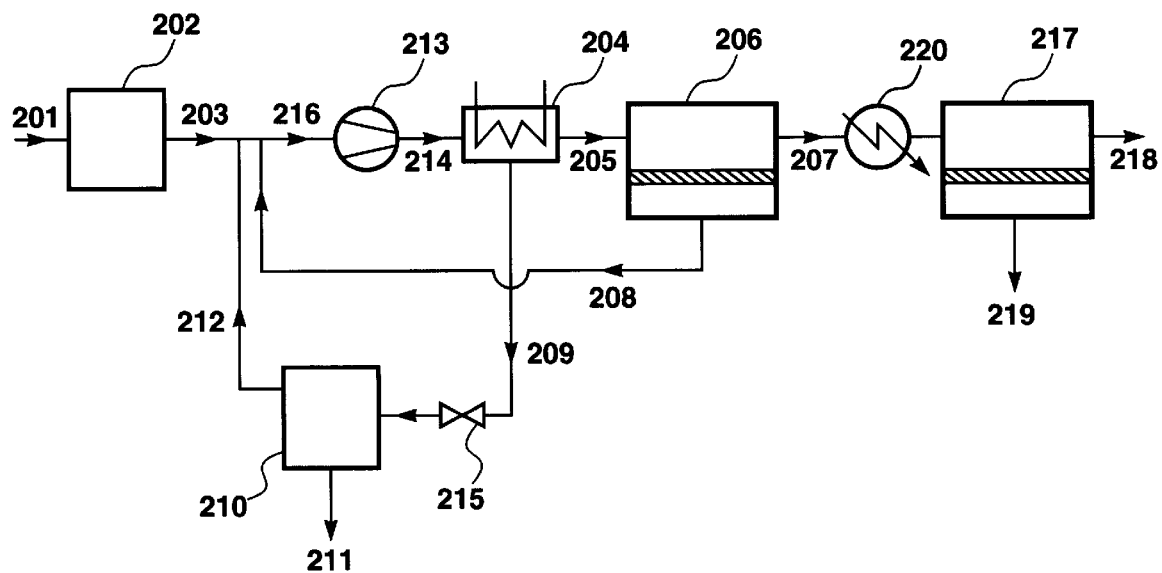
FIG. 2 is a schematic drawing showing an embodiment of the invention in which a two-step membrane separation operation is used and in which intermediate streams are recycled within the process.

No specific destination for the overhead gas stream, 112, is indicated in FIG. 1, and the invention encompasses both embodiments in which this gas is recirculated within the process and embodiments in which it is not. Although it will be desirable in some cases to recirculate this stream, such as is shown in FIG. 2, for example, discussed in more detail below, another destination for the gas may be preferred, such as to send it to the fuel gas line, or otherwise out of the process as a discrete stream.

Gas stream 105 leaves the compression/cooling step and passes to membrane separation step 106. The permeability of a gas or vapor through a membrane is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas.

Depending on the nature of the polymer, either the diffusion or the sorption component of the permeability may dominate. In rigid, glassy polymer materials, the diffusion coefficient tends to be the controlling factor and the ability of molecules to permeate is very size dependent. As a result, glassy membranes tend to permeate small, low-boiling molecules, such as hydrogen and methane, faster than larger, more condensable molecules, such as $C_{3+}$ organic molecules. For rubbery or elastomeric polymers, the difference in size is much less critical, because the polymer chains can be flexed, and sorption effects generally dominate the permeability. Elastomeric materials, therefore, tend to permeate larger, condensable molecules faster than small, low-boiling molecules. Thus, most rubbery materials are selective in favor of all $C_{3+}$ hydrocarbons over hydrogen. Examples of polymers that can be used to make such elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, and thermoplastic polyolefin elastomers. For the smallest, least condensable hydrocarbons, methane in particular, even rubbery polymers tend to be selective in favor of hydrogen, because of the relative ease with which the hydrogen molecule can diffuse through most materials. For example, neoprene rubber has a selectivity for hydrogen over methane of about 4, natural rubber a selectivity for hydrogen over methane of about 1.6, and Kraton, a commercial polystyrene-butadiene copolymer, has a selectivity for hydrogen over methane of about 2. Therefore, although any of the rubbery membrane materials mentioned above are useful for providing separation of $C_{2+}$ hydrocarbons from hydrogen, even most rubbery materials are unsuitable for the type of methane/hydrogen separation required in the present invention. To applicants' knowledge, among the polymeric membranes that perform gas separation based on the solution/diffusion mechanism, silicone rubber, specifically polydimethylsiloxane (PDMS) and closely related polymers are the only materials that are selective in favor of methane over hydrogen, and thus are potentially useful within the scope of the invention. Other materials that we expect may be found to be methane/hydrogen selective include other polysiloxanes, such as other alkyl-substituted siloxanes, copolymers of PDMS or other alkyl-substituted siloxane with other materials, and the like. For example, U.S. Pat. No. 4,370,150 cites data for silicone-polycarbonate copolymer membranes that suggest a pure gas selectivity of about 1.3 for methane over hydrogen, but this would, of course, depend on the exact composition of the polymer and the other components of an actual gas.

As mentioned above, the invention relies on obtaining a methane/hydrogen selectivity of at least about 2.5, more preferably at least about 3, and most preferably at least about 4 in the membrane separation step. However, such a selectivity is currently unknown from any membrane material at temperatures above 0° C. Our experiments with silicone rubber films and binary methane/hydrogen mixtures at sub-zero temperatures showed that the methane/hydrogen selectivity increases only slightly with decreasing temperature, from about 1.4 at 20° C. to about 1.9 at −20° C. Furthermore, the permeability of silicone rubber to both hydrogen and methane drops with decreasing temperature. Unexpectedly, however, in a multicomponent mixture containing hydrogen, methane and $C_{3+}$ hydrocarbons, the permeability of silicone rubber to methane was no longer found to decrease with decreasing temperature, but now to increase with decreasing temperature, a trend opposite to that observed with the binary gas mixture. In the same multicomponent mixture, however, the hydrogen permeability continues to decrease with decreasing temperature, resulting in a substantial increase in methane/hydrogen selectivity. In tests with silicone rubber films of a few hundred microns thickness, we found that a methane/hydrogen selectivity of 3, 4 or even 5 or more can be obtained when the film is exposed to a stream containing hydrogen, methane and a $C_{3+}$ hydrocarbon at sub-zero temperatures, such as −5° C. or −20° C. Using composite membranes of just a few microns thick in membrane modules, such as will be used in an actual industrial separation process, instead of thick silicone rubber films, it is necessary to go to slightly lower temperatures to achieve comparable performance. For example, a methane/hydrogen selectivity of 4 may be attained from a laboratory film at −20° C., but it may be necessary to go to −30° C. to attain that same selectivity from a module in an industrial plant.

On this basis, and taking into account also the preferred operating temperatures for the upstream condensation step, the preferred operating temperature for the membrane separation step 106 is in the range 0° C. to −40° C.

For some specific gas mixture/membrane material combinations, it may be possible to obtain adequate condensation of $C_{3+}$ hydrocarbons in the condensation step and to obtain the desired selectivity in the membrane separation step even at a temperature slightly above 0° C. In this case, operation at such a temperature will obviously reduce cooling costs and will be convenient if water vapor is present in the feed stream. On the other hand, the membrane separation performance may be less than would be achieved by operating at lower temperature.

The membrane may take any convenient form known in the art. The preferred form is a composite membrane including a microporous support layer for mechanical strength and a rubbery polymeric coating layer, most preferably silicone rubber, that is responsible for the separation properties. Additional layers may be included in the structure as desired, such as to provide strength, protect the selective layer from abrasion, and so on.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice. Since conventional polymeric materials are used for the membranes, they are relatively easy and inexpensive to prepare and to house in modules, compared with other types of membranes that might be used as hydrogen-rejecting membranes, such as finely microporous inorganic membranes, including adsorbent carbon membranes, pyrolysed carbon membranes and ceramic membranes.

To achieve a high transmembrane hydrocarbon flux, the selective layer responsible for the separation properties should be thin, preferably, but not necessarily, no more than 30 $\mu$m thick, more preferably no more than 20 $\mu$m thick, and most preferably no more than about 10 $\mu$m thick. Although composite membranes with silicone rubber selective layers of just 1 or 2 $\mu$m thick can be made, extremely thin membranes, such as less than about 5 $\mu$m thick are not preferred, since the resulting extremely high fluxes may give rise to a permeant-depleted boundary layer at the membrane surface on the feed side, and hence to overall diminished separation performance.

A driving force for transmembrane permeation is provided by a pressure difference between the feed and permeate sides of the membrane. Most preferably, this driving force is provided, if stream 103 is not already at high pressure, by compressing the gas as part of step 104, so that stream 105 emerges at an elevated pressure, typically of a few hundred psi. The pressure on the permeate side may be atmospheric, or may be maintained at an above-atmospheric or below-atmospheric pressure convenient with respect to the destination of the permeate stream. As a general guide, a pressure ratio (feed pressure/permeate pressure) of at least about four or five is preferred.

By selectively removing the non-hydrogen components, the membrane separation step results in a membrane residue stream, 107, that is enriched in hydrogen compared with the membrane feed stream, 105. Typically, but not necessarily, stream 107 will contain more than 60% hydrogen, such as 70% hydrogen, 75% hydrogen, 80% hydrogen or more. This stream can be sent to any desired destination. For example, it may be returned to the process from which stream 101 originates, or cascaded to another process within the refinery or chemical plant. It may also be sent for further treatment, for example by PSA, to produce a high-purity hydrogen product stream.

The membrane separation step also results in a permeate stream, 108, that is enriched in $C_{3+}$ hydrocarbons compared with the membrane feed stream 105. This stream can be sent to any desired destination, such as directly to the plant fuel header, to further treatment, or to a saturated gas plant for splitting into separate $C_2$–$C_5$ hydrocarbon fractions. Most preferably, particularly if it contains a high percentage of $C_{3+}$ hydrocarbons, such as above 10% hydrocarbons, at least a portion of stream 108 is recirculated to the compression/cooling step, as illustrated below with respect to FIG. 2.

The use of a polymeric, hydrogen-rejecting membrane brings a number of advantages. First, it means that the hydrogen product stream is the membrane residue stream, and is thus available from the process at essentially the same pressure as the feed stream. In contrast, other membranes, including all conventional glassy membranes, deliver the hydrogen-enriched stream as the permeate stream, and the permeate stream, assuming a typical feed/permeate side pressure ratio of 2–10, be at a pressure of only 10% to half that of the feed. Since one frequent goal of the separation is to create a source of hydrogen for reuse in the plant, the ability to deliver this hydrogen without the need for recompression is very attractive.

A second benefit of preferential hydrocarbon permeation is that the membrane thereby serves as an expansion device for a gas fraction that undergoes significant Joule-Thomson cooling, as described in U.S. Pat. No. 5,762,685. As a result, the membrane separation step can produce streams that are significantly colder, such as 10° C., 20° C. or more colder, than the membrane feed stream. These streams can be used to provide cooling for the condensation step.

A third benefit is that the membranes provide much higher transmembrane fluxes than conventional glassy membranes. For example, the permeability of silicone rubber to methane is 800 Barrer, compared with a permeability of less than 2 Barrer for 6FDA polyimide or cellulose acetate, both used in conventional glassy membranes.

A fourth benefit is that the membranes can tolerate relatively high concentrations of $C_{3+}$ hydrocarbons and contaminants such as hydrogen sulfide and water vapor. These materials simply pass through the membrane to the permeate side without damage to the membrane material itself Thus the process of the invention can produce hydrogen residue streams that are both dried and reduced in hydrogen sulfide content. This greatly simplifies downstream use or further processing of this stream, such as by PSA.

Depending on the hydrocarbon composition of the membrane feed stream 105, a single-stage membrane separation operation may be adequate to raise the hydrogen content of the residue stream to an acceptable level, such as 50%, 60%, 70%, 80% or more. If the residue stream requires further purification, it may be passed to a second bank of modules for a second processing step. If the second residue stream requires further purification, it may be passed to a third bank of modules for a third processing step, and so on. Multistep configurations are well adapted to handle feed streams that contain relatively low concentrations of hydrogen, such as 20% hydrogen or 30% hydrogen. If the permeate stream requires further concentration, it may be passed to a second bank of modules for a second-stage treatment, and so on.

Such multistage or multistep processes, and variants thereof, will be familiar to those of skill in the art, who will appreciate that the membrane separation step may be configured in many possible ways, including single-stage, multistage, multistep, or more complicated arrays of two or more units in series or cascade arrangements.

If the concentration of hydrogen in the feed stream is low, even a two-step or three-step process may not raise the hydrogen content of the hydrogen product stream to the desired level. In this case, it is convenient to pass the hydrogen product stream to a non-membrane treatment step, such as adsorption, for production of an appropriate purity hydrogen stream. Combinations of membrane separation with pressure swing adsorption (PSA) are particularly preferred in this regard. As mentioned above, the membrane separation step of the invention provides the hydrogen stream as feed for the PSA unit at pressure, not as a pressure-reduced permeate, thereby facilitating integration of the membrane separation step and the PSA step.

Turning to FIG. 2, this shows a particularly preferred embodiment of the invention in which intermediate streams are recycled within the process and in which two membrane separation steps are used. Hydrocarbon stream, 201, is subjected to a processing operation, 202, that yields off-gas stream 203. This stream is mixed with the flash overhead, 212 and the first membrane permeate, 208, to form combined stream 216. This stream passes through compressor, 213, which produces compressed stream, 214. Stream 214 then passes through heat exchanger or chiller, 204, to lower the temperature, the combination of compression and cooling resulting in the formation of a condensed stream, 209, containing hydrocarbons and a small amount of dissolved hydrogen, and an uncondensed stream, 205, still containing some mixed hydrocarbons. The condensed stream or condensate, 209, then passes through expansion valve, 215, thereby reducing the pressure, and into flash tank, 210. The resulting volume of gas that is generated contains mostly hydrogen, $C_1$ and $C_2$ hydrocarbons and is withdrawn as overhead stream 212 and recirculated for recompression with stream 203.

The liquid product, which has now been twice enriched in the higher-boiling $C_{3+}$ hydrocarbons, is withdrawn as stream, 211.

The uncondensed stream, 205, is fed to the first membrane separation step or unit, 206. In this case, two membrane separation steps are used, 206 and 217, and it is not necessary that step 206 provide a high methane/hydrogen selectivity of 2.5 or more. Thus, although silicone rubber membranes are still most preferred, other membranes taught in parent application Ser. No. 09/083,660, such as rubbery membranes that are selective for $C_{2+}$ hydrocarbons over hydrogen and superglassy polymers, may be used in this step. Also, the step may optionally be operated at a higher temperature, such as above 0° C. This reduces the overall cooling load of the process. In addition, any water vapor present in the feed gas will permeate the membrane, be recirculated in stream 208 and be removed from the process in stream 211. The first membrane separation step produces permeate stream 208, enriched in $C_{3+}$ hydrocarbons and depleted in hydrogen. This hydrocarbon-enriched stream is recirculated via compressor 213 to cooling/condensation step 204 for additional recovery of LPG. Hydrogen-enriched residue stream 207, now depleted in water vapor, if originally present, is withdrawn and passed to second membrane separation step 217. The requirements for the membranes used in this step are the same as those discussed above with respect to FIG. 1, namely that they be rubbery polymeric membranes capable of exhibiting a methane/hydrogen selectivity of at least about 2.5, more preferably at least about 3 and most preferably at least about 4 under the conditions of the process. Thus, for this step, polysiloxane membranes are preferred, and silicone rubber membranes are most preferred, and the preferred temperature operating range for the membrane is between 0° C. and −40° C. Because stream 207 has been dried by the first membrane separation step, sub-zero temperatures can now be used for the second membrane separation step without concern about ice formation. As the gas has already passed through the first membrane separation step, stream 207 is substantially lighter in $C_{3+}$ hydrocarbon content than stream 205. However, stream 207 is usually as much as 5° C., 10° C., 15° C. or more colder than membrane feed stream 205 as a result of Joule-Thomson cooling brought about by permeation of condensable hydrocarbons, and, as the temperature of the feed gas drops, less of the $C_{3+}$ hydrocarbon gas is required to maintain the membrane selectivity above about 2.5.

If stream 207 is not at a temperature low enough to provide the required selectivity in unit 217, it may be subjected to further optional cooling, 220, as indicated, before being introduced into unit 217. The second membrane separation step produces methane-enriched and hydrogen-depleted permeate purge stream, 219, which is sent to fuel gas or otherwise disposed of, and hydrogen-enriched residue stream 218, which may be recirculated to reactor 202, used elsewhere in the plant or sent to a PSA unit or the like for generation of high-purity hydrogen.

As stated above, the process of the invention may be applied to any off-gas stream containing a mixture of hydrogen and light hydrocarbons. Representative, non-limiting locations in which the process of the invention is particularly useful are refineries and petrochemical plants.

The processes of the invention are especially attractive compared with other separation alternatives for:

1. Catalytic Cracking:
   Treatment of off-gases previously destined for the fuel gas line, such as overhead gas from absorbers, treatment of overhead gas from strippers and debutanizers in fluid catalytic crackers, including specialized crackers, such as deep catalytic crackers.
2. Hydrotreating:
   Treatment of gas from high- and low-pressure separators and flash tanks in hydrotreating units of all kinds. Treatment of overhead light ends from product strippers and fractionators as appropriate. Treatment of off-gases and purge streams from amine scrubbers, or in some cases, replacement of amine scrubbers.
3. Hydrocracking:
   Clean up of recycle and other off-gas streams from hydrocrackers, such as overhead product gas from the product fractionators.
4. Catalytic Reforming:
   Treatment of off-gas from product separators and stabilizers, for hydrogen recovery from fuel gas and light ends from reformer trains.
5. Coking:
   Treatment of light $C_{4-}$ reactor gases and gases from fractionators, splitters and strippers in delayed coking trains.
6. Distillate Dewaxing:
   Recovery of hydrogen from high- and low-pressure separators for reuse in the process.
7. Gas Plant Operations:
   Recovery of hydrogen from light overheads from demethanizer and deethanizer columns in unsaturated and saturated gas plants.
8. Aromatics Production/Dealkylation:
   Treatment of off-gas from product separator units, to recover hydrogen for recycle to the reactor feed, and of light ends from various sources.
9. Isomerization:
   Treatment of light ends from scrubbers, separators and the like in diverse isomerization reaction trains.
10. Hydrogenation/Dehydrogenation:
    Treatment of hydrogen-rich streams from product separators and overhead light streams from strippers and other separation equipment.
11. Olefin Production:
    Separation of methane and other light hydrocarbons from hydrogen in ethylene cracker off-gases from condensers and overhead streams from demethanizers. This application is discussed in detail in parent application Ser. No. 08/789,376, now U.S. Pat. No. 5,785,739, issued Jul. 28, 1998.

With respect to many applications of the type outlined above, the processes of the invention enable useful products to be retrieved from what was previously essentially a waste stream. In particular, many refinery streams that previously would have been sent to the foul gas or fuel gas line, where only the fuel value of the components is extracted, can now be processed to retrieve chemical value from at least a fraction of the components. Recovery of even a few extra percent of hydrogen, $C_{3+}$ hydrocarbons, or both, can bring substantial economic advantage, as shown in the examples below.

Further benefits accrue in that the recovered hydrogen can often be reused in the process generating the off-gas, or elsewhere in the refinery or plant. The ability to thereby provide a higher partial pressure of hydrogen in the reaction zone can be extremely beneficial in hydrotreating and other similar processes.

The invention is now illustrated in further detail by specific examples. These examples are intended to further clarify the invention, and are not intended to limit the scope in any way.

EXAMPLES

Example 1
Preparation of Silicone Rubber Films

Dense, isotropic films of silicone rubber (polydimethylsiloxane) [PDMS] were made from a 4-wt % solution of silicone rubber in iso-octane (Silicone Dehesive 940 A, Wacker Silicone Corp., Adrian, Mich.). The silicone rubber solution contained a crosslinker (V 24) and a platinum-based catalyst. The solution was cast on a glass plate, and the solvent was evaporated at ambient conditions for one week. The films were then dried in a vacuum oven at 80° C. for 12 hours. The thickness of the resulting films was determined with a precision micrometer. Film samples with thicknesses of 100–300 μm (±1 μm) were used for the permeation experiments.

Example 2
Permeation Properties of Silicone Rubber Films with a Binary Gas Mixture An experiment was carried out to determine the performance of silicone rubber films at different temperatures. Films were prepared as in Example 1. Samples of the films were cut into 12.6-cm² stamps, and subjected to permeation tests in a permeation test-cell apparatus. The tests were performed using the constant pressure/variable volume method, with a gas mixture containing 50% hydrogen and 50% methane. The feed pressure was 150 psig, the permeate pressure was atmospheric (0 psig), and the feed temperature was varied between −20° C. and 35° C. The compositions of the residue and permeate were determined with a gas chromatograph equipped with a thermal conductivity detector, and permeabilities were calculated. The methane/hydrogen selectivity was calculated from the ratio of the permeabilities. The stage-cut, that is, the ratio of permeate to feed flow rate, was always less than 1%.

Figure 3:
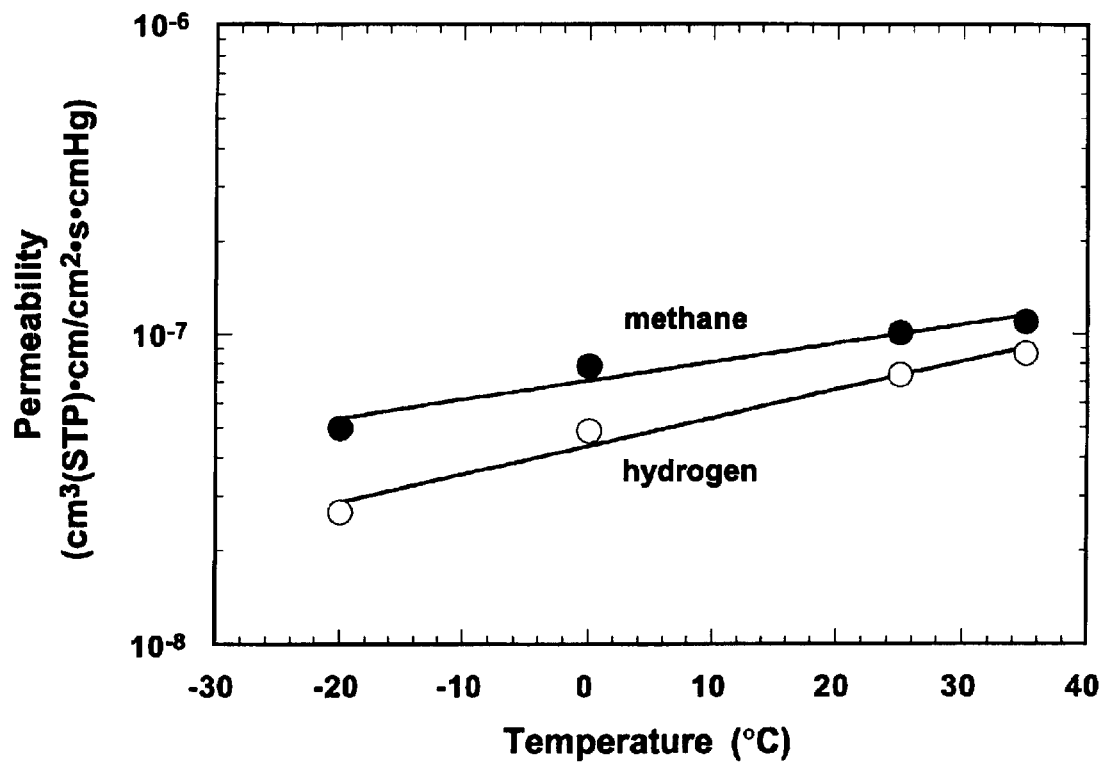
FIG. 3 is a graph showing the effect of temperature on the permeabilities of methane and hydrogen in a binary gas mixture through a silicone rubber film.
Figure 4:
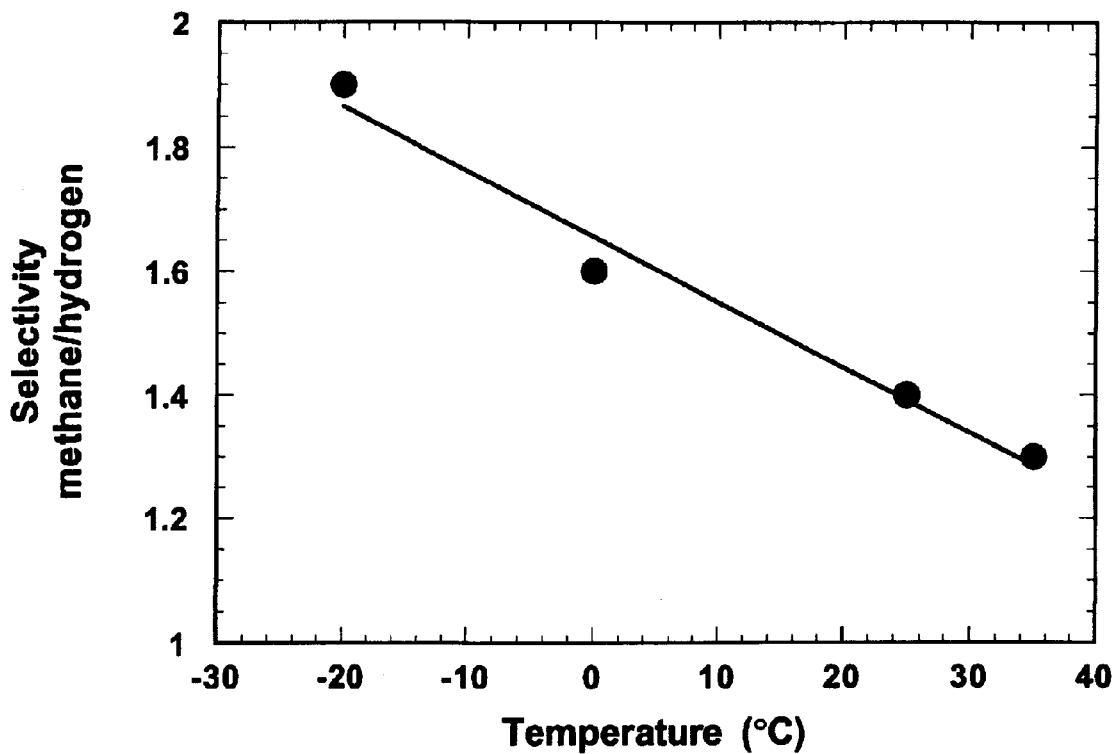
FIG. 4 is a graph showing the effect of temperature on the methane/hydrogen selectivity of a silicone rubber film measured with a binary gas mixture.

Permeability and selectivity results are shown in FIGS. 3 and 4, respectively, as a function of temperature. The methane and hydrogen permeabilities both decreased with decreasing feed temperature. The silicone rubber film was more permeable to methane than to hydrogen over the whole temperature range. Because the hydrogen permeability of silicone rubber exhibited a stronger temperature dependence than that of methane, the methane/hydrogen selectivity increased slightly from about 1.3 at 35° C. to about 1.9 at −20° C., as shown in FIG. 4.

Example 3

Permeation Properties of Silicone Rubber Films with Pure Gases

Figure 5:
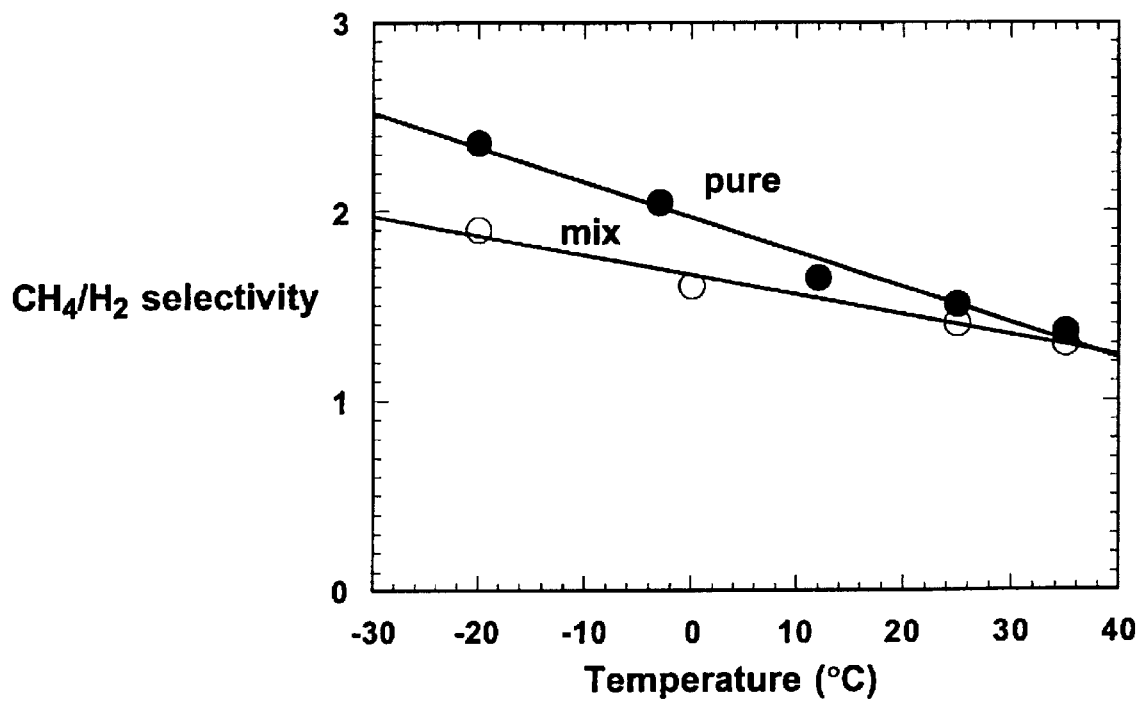
FIG. 5 is a graph comparing the effect of temperature on the methane/hydrogen selectivity of a silicone rubber film as measured with pure gases and with a binary gas mixture.

The experiment of Example 2 was repeated with pure hydrogen and pure methane. All experimental conditions were as in Example 2. The pure gas fluxes of the films were measured, and the methane/hydrogen selectivity was calculated. FIG. 5 compares the calculated pure gas methane/hydrogen selectivity to the mixed-gas methane/hydrogen selectivity obtained in Example 2.

Example 4

Permeation Properties of Silicone Rubber Films with a Multicomponent Gas Mixture The experiment of Example 2 was repeated with a gas mixture containing 50 vol % hydrogen, 19 vol % methane, 19 vol % ethane, 10 vol % propane, and 2 vol % n-butane. All experimental conditions were as in Example 2. The compositions of the residue and permeate were determined with a gas chromatograph equipped with a thermal conductivity detector, and permeabilities were calculated. The hydrocarbon/hydrogen selectivities were calculated from the ratios of the permeabilities.

Figure 6:
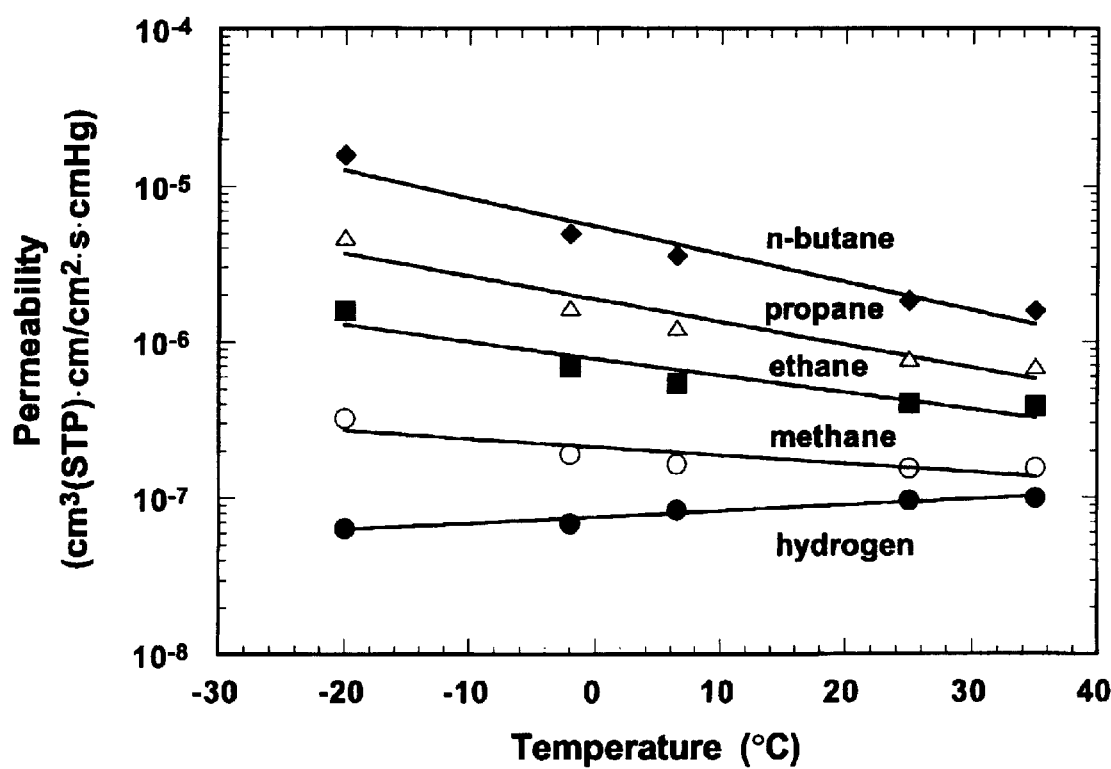
FIG. 6 is a graph showing the effect of temperature on the permeabilities of hydrogen, methane, ethane, propane and n-butane in a multicomponent gas mixture through a silicone rubber film.
Figure 7:
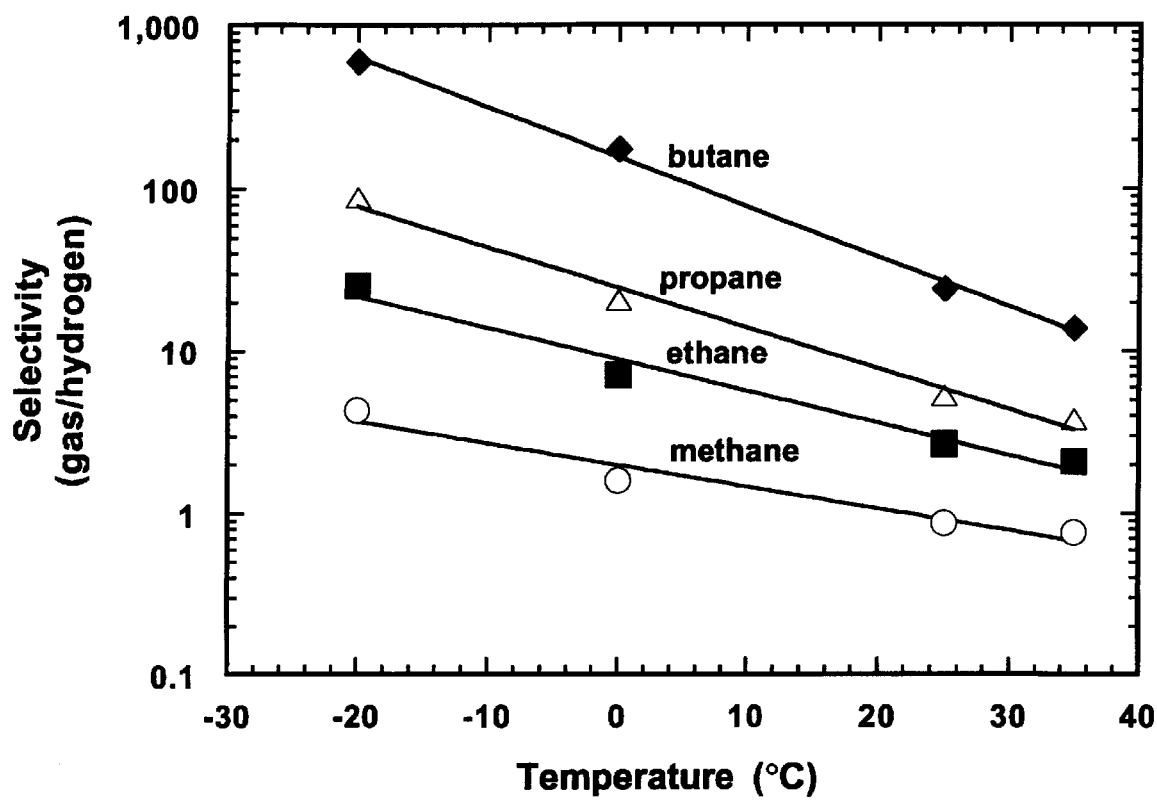
FIG. 7 is a graph showing the effect of temperature on the hydrocarbon/hydrogen selectivities of a silicone rubber film measured with a multicomponent gas mixture.

Permeability and selectivity results are shown in FIGS. 6 and 7, respectively, as a function of temperature. The permeabilities of both methane and hydrogen were higher at 35° C. in the multicomponent mixture than in the binary mixture. The permeability of hydrogen showed the same trend in the multicomponent mixture as in the binary mixture, that is, it decreased with decreasing temperature. The permeabilities of methane, ethane, propane and n-butane increased with decreasing feed temperature. For the most condensable gas, n-butane, the permeability increase was about 10-fold, from about 20,000 Barrer at 35° C. to about 200,000 Barrer at −20° C. The methane permeability almost doubled, from about 1,500 Barrer to about 3,000 Barrer, as the temperature was lowered from 35° C. to −20° C. This is an unexpected result, and the opposite from the trend in the binary mixture case, where decreasing the temperature also decreased the methane permeability.

As a result, the mixed-gas hydrocarbon/hydrogen selectivities increased significantly as the feed temperature decreased, as shown in FIG. 7. The methane/hydrogen selectivity increased from about 1.4 at 35° C. to about 5 at −20° C.

Example 5

A computer calculation was performed with a modeling program, ChemCad III (ChemStations, Inc., Houston, Tex.), to simulate the treatment of a typical overhead stream from the absorbers of a fluid catalytic cracker unit (FCCU).

The stream was assumed to have a flow rate of 5 MMscfd and the following volume composition:

Hydrogen 20%
Methane 15%
Ethane 12.5%
Propane 12.5%
n-Butane 2.5%
n-Pentane 2.5%
Ethylene 10%
Propylene 25%

The treatment process was assumed to be carried out according to the process design shown in FIG. 2. Thus, box 202 in this case represents a catalytic cracker plant, and stream 203 represents the overhead stream from the light oil absorbers used to separate the $C_{3+}$ fraction from the lighter gas in the gas concentration section of the cracker plant. The compression/cooling step was assumed to compress the overhead gas to 300 psia and cool it to −10° C. Both membrane steps were assumed to be carried out using silicone rubber membranes operating at a temperature and gas composition that yields a methane/hydrogen selectivity of 2.5.

Membrane pressure-normalized fluxes in both membrane units were assumed to be as follows:

Hydrogen $100 \times 10^{-6}$ $cm^3(STP)/cm^2 \cdot sec \cdot cmHg$
Methane $250 \times 10^{-6}$ $cm^3(STP)/cm^2 \cdot sec \cdot cmHg$
Ethane $1,000 \times 10^{-6}$ $cm^3(STP)/cm^2 \cdot sec \cdot cmHg$
Propane $2,000 \times 10^{-6}$ $cm^3(STP)/cm^2 \cdot sec \cdot cmHg$
n-Butane $5,000 \times 10^{-6}$ $cm^3(STP)/cm^2 \cdot sec \cdot cmHg$
n-Pentane $7,000 \times 10^{-6}$ $cm^3(STP)/cm^2 \cdot sec \cdot cmHg$
Ethylene $250 \times 10^{-6}$ $cm^3(STP)/cm^2 \cdot sec \cdot cmHg$
Propylene $1,000 \times 10^{-6}$ $cm^3(STP)/cm^2 \cdot sec \cdot cmHg$ The results of the calculations are shown in Table 1. The stream numbers correspond to FIG. 2.

TABLE 1

| Component/Parameter | Stream 203 | Stream 216 | Stream 205 | Stream 209 | Stream 207 | Stream 208 | Stream 211 | Stream 212 | Stream 218 | Stream 219 |
| --- | --- | --- | --- | --- | --- | --- | --- | --- | --- | --- |
| Mass Flow Rate (lb/h) | 28,663 | 39,324 | 14,665 | 24,659 | 7,910 | 6,756 | 20,751 | 3,908 | 2,275 | 5,635 |
| Temperature (° C.) | 35 | 23 | −10 | −10 | −17 | −17 | 25 | 25 | −19 | −19 |
| Pressure (psia) | 50 | 50 | 300 | 300 | 300 | 50 | 300 | 300 | 300 | 50 |

TABLE 1-continued

| Component/Parameter | Stream 203 | Stream 216 | Stream 205 | Stream 209 | Stream 207 | Stream 208 | Stream 211 | Stream 212 | Stream 218 | Stream 219 |
|---|---|---|---|---|---|---|---|---|---|---|
| Component (mol %) | | | | | | | | | | |
| Hydrogen | 20.0 | 17.0 | 30.6 | 0.7 | 39.9 | 11.3 | 0.1 | 3.2 | 58.7 | 30.3 |
| Methane | 15.0 | 15.8 | 25.4 | 4.2 | 28.0 | 20.0 | 2.0 | 13.3 | 18.5 | 32.8 |
| Ethane | 12.5 | 16.3 | 15.7 | 17.0 | 9.8 | 27.9 | 15.2 | 24.8 | 0.9 | 14.4 |
| Propane | 12.5 | 12.2 | 4.9 | 21.1 | 2.0 | 10.7 | 23.0 | 13.3 | 0.1 | 3.0 |
| n-Butane | 2.5 | 2.0 | 0.2 | 4.2 | 0.1 | 0.6 | 4.9 | 1.0 | — | 0.1 |
| n-Pentane | 2.5 | 1.9 | 0.1 | 4.1 | — | 0.2 | 5.0 | 0.4 | — | — |
| Ethylene | 10.0 | 10.4 | 12.0 | 8.5 | 13.2 | 9.4 | 6.8 | 15.4 | 1.2 | 19.3 |
| Propylene | 25.0 | 24.4 | 11.2 | 40.2 | 7.0 | 19.8 | 43.0 | 28.7 | 20.7 | 0.0 |
| Component (lb/h) | | | | | | | | | | |
| Hydrogen | 403.2 | 466.0 | 457.1 | 8.9 | 402.0 | 55.1 | 1.2 | 7.7 | 199.6 | 202.4 |
| Methane | 2,406 | 3,438 | 3,020 | 418.0 | 2,244 | 776.2 | 162.4 | 255.6 | 502.2 | 1,742 |
| Ethane | 3,759 | 6,669 | 3,498 | 3,171 | 1,476 | 2,022 | 2,281 | 889.3 | 43.9 | 1,433 |
| Propane | 5,512 | 7,349 | 1,586 | 5,762 | 448.0 | 1,138 | 5,064 | 698.3 | 4.7 | 443.3 |
| n-Butane | 1,453 | 1,609 | 103.7 | 1,505 | 17.9 | 85.8 | 1,435 | 70.1 | 0.1 | 17.8 |
| n-Pentane | 1,804 | 1,864 | 33.1 | 1,831 | 5.0 | 28.1 | 1,798 | 32.2 | 1.1 | 3.8 |
| Ethylene | 2,805 | 3,959 | 2,487 | 1,472 | 1,848 | 639.2 | 957.0 | 514.7 | 54.9 | 1,793 |
| Propylene | 10,520 | 13,970 | 3,479 | 10,491 | 1,468 | 2,011 | 9,051 | 1,440 | 1,468 | 0.0 |

Membrane Area = 550 m²
Theoretical Horsepower = 1,130 hp
— = less than 0.1

This process design recovers almost 10,000 lb/h of light olefins, 800 lb/h of $C_{3+}$ paraffins and 200 lb/h of hydrogen from what would otherwise be simply a fuel gas stream. The production of fuel gas is reduced from nearly 30,000 lb/h to under 6,000 lb/h.

The hydrogen product stream 218 contains nearly 60% hydrogen, and is suitable to be sent to pressure swing adsorption to recover a high purity hydrogen stream.

Example 6

A computer calculation was performed as in Example 5 to simulate the treatment of a typical gas stream from the low-pressure separator of a hydrocracker.

The stream was assumed to have a flow rate of 5 MMscfd, and the following volume composition:

Hydrogen 70%
Methane 7.5%
Ethane 7.5%
Propane 5%
n-Butane 5%
n-Pentane 5%

The treatment process was assumed to be carried out according to the process design shown in FIG. 2. Thus, box 202 in this case represents a hydrocracker, and stream 203 represents the overhead stream from the low-pressure separator. The compression/cooling step was assumed to compress the overhead gas to 400 psia and cool it to −10° C. Both membrane steps were assumed to be carried out using silicone rubber membranes exhibiting a methane/hydrogen selectivity of 2.5.

Membrane pressure-normalized fluxes were assumed to be as in Example 5. The results of the calculations are shown in Table 2. The stream numbers correspond to FIG. 2.

TABLE 2

| Component/Parameter | Stream 203 | Stream 216 | Stream 205 | Stream 209 | Stream 207 | Stream 208 | Stream 211 | Stream 212 | Stream 218 | Stream 219 |
|---|---|---|---|---|---|---|---|---|---|---|
| Mass Flow Rate (lb/h) | 7,885 | 10,265 | 5,161 | 5,104 | 2,809 | 2,352 | 5,075 | 28.6 | 614.1 | 2,195 |
| Temperature (° C.) | 35 | 26 | 10 | −10 | −12 | −12 | 25 | 25 | −14 | −14 |
| Pressure (psia) | 75 | 50 | 400 | 400 | 400 | 50 | 300 | 300 | 400 | 50 |
| Component (mol %) | | | | | | | | | | |
| Hydrogen | 70.0 | 65.5 | 75.5 | 1.6 | 83.4 | 44.3 | 1.0 | 43.4 | 95.0 | 74.0 |
| Methane | 7.5 | 8.2 | 9.2 | 1.8 | 8.6 | 11.3 | 1.6 | 13.1 | 4.5 | 12.0 |
| Ethane | 7.5 | 11.1 | 10.4 | 15.2 | 6.0 | 27.8 | 15.0 | 25.2 | 0.4 | 10.6 |
| Propane | 5.0 | 6.2 | 3.6 | 22.8 | 1.5 | 11.7 | 22.9 | 12.0 | — | 2.7 |
| n-Butane | 5.0 | 4.8 | 1.0 | 28.7 | 0.3 | 3.9 | 29.1 | 4.7 | — | 0.6 |
| n-Pentane | 5.0 | 4.3 | 0.3 | 29.9 | 0.1 | 1.0 | 30.3 | 1.6 | — | 0.1 |
| Component (lb/h) | | | | | | | | | | |
| Hydrogen | 818.8 | 929.5 | 926.4 | 3.2 | 816.9 | 109.5 | 1.9 | 1.3 | 418.5 | 398.3 |
| Methane | 698.2 | 922.9 | 895.5 | 27.5 | 673.8 | 221.7 | 24.4 | 3.0 | 158.4 | 515.3 |
| Ethane | 1,309 | 2,345 | 1,907 | 438.0 | 881.7 | 1,025 | 427.0 | 11.0 | 27.4 | 854.3 |

TABLE 2-continued

| Component/Parameter | Stream 203 | Stream 216 | Stream 205 | Stream 209 | Stream 207 | Stream 208 | Stream 211 | Stream 212 | Stream 218 | Stream 219 |
|---|---|---|---|---|---|---|---|---|---|---|
| Propane | 1,279 | 1,918 | 955.7 | 962.6 | 324.5 | 631.2 | 954.9 | 7.6 | 3.5 | 321.0 |
| n-Butane | 1,686 | 1,966 | 363.6 | 1,603 | 87.6 | 276.0 | 1,599 | 4.0 | 0.3 | 87.3 |
| n-Pentane | 2,093 | 2,183 | 113.2 | 2,070 | 24.9 | 88.3 | 2,068 | 1.7 | 5.9 | 19.0 |

Membrane Area = 433 m$^2$
Theoretical Horsepower = 752 hp
— = less than 0.1

The process recovers over 4,500 lb/h of $C_{3+}$ hydrocarbons, and over 400 lb/h of hydrogen. The second membrane permeate can be sent to the fuel line. Thus the gas sent to fuel is reduced from about 8,000 lb/h, without treatment, to only about 2,000 lb/h.

Example 7

A computer calculation was performed to simulate the treatment of a typical off-gas stream from the first phase separator of a hydrotreater process. The stream was assumed to have a flow rate of 5 MMscfd, and the following volume composition:

Hydrogen 45.5%

Methane 25%

Ethane 14%

Propane 10% n-Butane 3% n-Pentane 2.5%

The treatment process was assumed to be carried out according to the process design shown in FIG. 1. The cooling step was assumed to lower the gas temperature to −20° C. Membrane pressure-normalized fluxes were assumed to be as in Example 5. The results of the calculations are shown in Table 3. The stream numbers correspond to FIG. 1.

TABLE 3

| Component/Parameter | Stream 103 | Stream 105 | Stream 109 | Stream 111 | Stream 112 | Stream 107 | Stream 108 |
|---|---|---|---|---|---|---|---|
| Mass Flow Rate (lb/h) | 9,919 | 5,831 | 4,089 | 3,850 | 238.8 | 414.3 | 5,416 |
| Temperature (° C.) | 148 | −20 | −20 | 25 | 25 | −29 | −29 |
| Pressure (psia) | 400 | 400 | 400 | 400 | 300 | 400 | 50 |
| Component (mol %) | | | | | | | |
| Hydrogen | 45.5 | 53.6 | 1.3 | 0.3 | 10.5 | 90.6 | 41.2 |
| Methane | 25.0 | 28.4 | 6.3 | 3.9 | 28.6 | 9.4 | 34.9 |
| Ethane | 14.0 | 12.6 | 21.8 | 20.5 | 34.2 | 0.1 | 16.8 |
| Propane | 10.0 | 4.8 | 38.2 | 39.9 | 22.2 | — | 6.4 |
| n-Butane | 3.0 | 0.5 | 16.8 | 18.2 | 3.4 | — | 0.6 |
| n-Pentane | 2.5 | 0.1 | 15.6 | 17.1 | 1.1 | 0.0 | 0.1 |
| Component (lb/h) | | | | | | | |
| Hydrogen | 532.2 | 530.0 | 2.3 | 0.5 | 1.8 | 225.3 | 304.6 |
| Methane | 2,327 | 2,237 | 90.3 | 50.7 | 39.6 | 185.3 | 2,052 |
| Ethane | 2,443 | 1,853 | 590.8 | 501.4 | 88.9 | 3.0 | 1,850 |
| Propane | 2,559 | 1,043 | 1,516 | 1,431 | 84.7 | 0.6 | 1,042 |
| n-Butane | 1,012 | 132.9 | 878.9 | 861.9 | 17.0 | — | 132.9 |
| n-Pentane | 1,047 | 35.4 | 1,011 | 1,004 | 6.9 | 0.0 | 35.4 |

Membrane Area = 300 m$^2$
Theoretical Horsepower = 96 hp
— = less than 0.1

The process produces a hydrogen product stream, 107, with a hydrogen content of 90% at 400 psia. The hydrogen content and pressure of this stream make it well suited for further purification by pressure swing adsorption, if desired, or for return to the reactor. The process also produces a $C_{3+}$ hydrocarbon product stream, 111, with a $C_{3+}$ content of 75%. Streams 112 and 108 could be sent to the fuel gas line, in which case the gas sent to the fuel line is reduced from about 10,000 lb/h to about 5,600 lb/h. Alternatively, stream 108, still containing about 7% $C_{3+}$ hydrocarbons, could be sent for further processing to recover additional $C_{3+}$ components before being sent on to the fuel line.

We claim:

1. A process for treating an off-gas stream, containing at least hydrogen, methane and a $C_{3+}$ hydrocarbon, comprising the following steps:

(a) cooling the off-gas stream to a temperature no lower than about −40° C., resulting in partial condensation of the off-gas stream, thereby dividing the off-gas stream into a condensed portion enriched in $C_{3+}$ hydrocarbon and an uncondensed portion enriched in hydrogen;

(b) passing the uncondensed portion as a feed stream to a membrane separation unit, the membrane separation unit containing a rubbery polymeric membrane having a feed side and permeate side, and being selectively permeable to methane over hydrogen, under conditions sufficient that the membrane exhibits a methane/hydrogen selectivity of at least about 2.5;

(c) withdrawing from the permeate side a permeate stream enriched in methane and $C_{3+}$ hydrocarbon compared with the uncondensed portion;

(d) withdrawing from the feed side a hydrogen-enriched product gas;

(e) passing the condensed portion to a hydrocarbon separation step for separation of a $C_{3+}$ hydrocarbon fraction and a lighter hydrocarbon fraction from the condensed portion.

2. The process of claim 1, wherein the temperature is no lower than about $-20°$ C.

3. The process of claim 1, wherein the selectivity exhibited in step (b) is at least about 3.

4. The process of claim 1, wherein the selectivity exhibited in step (b) is at least about 4.

5. The process of claim 1, wherein the off-gas stream is subjected to a compression step prior to the cooling step.

6. The process of claim 1, wherein the lighter hydrocarbon fraction is recirculated to the cooling step.

7. The process of claim 1, wherein the hydrocarbon separation step is carried out by flashing the condensed portion.

8. The process of claim 1, wherein the hydrocarbon separation step is carried out by distilling the condensed portion.

9. The process of claim 1, wherein the permeate stream is passed to an additional treatment step for further separation of hydrogen from hydrocarbons.

10. The process of claim 1, wherein the hydrogen-enriched product gas is passed to an additional treatment step.

11. The process of claim 10, wherein the additional treatment step comprises a membrane separation step.

12. The process of claim 10, wherein the additional treatment step comprises pressure swing adsorption.

13. The process of claim 1, wherein the membrane comprises silicone rubber.

14. The process of claim 1, wherein the membrane comprises a polysiloxane.

15. A process for treating an off-gas stream, containing at least hydrogen, methane and a $C_{3+}$ hydrocarbon, comprising the following steps:

(a) cooling the off-gas stream to a temperature no lower than about $-40°$ C., resulting in partial condensation of the off-gas stream, thereby dividing the off-gas stream into a condensed portion enriched in $C_{3+}$ hydrocarbon and an uncondensed portion enriched in hydrogen;

(b) passing the uncondensed portion as a first feed stream across the first feed side of a first polymeric membrane having a first feed side and a first permeate side, and being selectively permeable to $C_{2+}$ hydrocarbons over hydrogen;

(c) withdrawing from the first permeate side a first permeate stream enriched in $C_{3+}$ hydrocarbons compared with the uncondensed portion;

(d) withdrawing from the first feed side a first residue stream enriched in hydrogen compared with the uncondensed portion;

(e) passing the first residue stream as a second feed stream across the second feed side of a second rubbery polymeric membrane having a second feed side and a second permeate side, and being selectively permeable to methane over hydrogen, under conditions sufficient that the membrane exhibits a methane/hydrogen selectivity of at least about 2.5;

(f) withdrawing from the second permeate side a second permeate stream enriched in methane and $C_{3+}$ hydrocarbon compared with the first residue stream;

(g) withdrawing from the second feed side a second residue stream enriched in hydrogen compared with the first residue stream;

(h) passing the condensed portion to a hydrocarbon separation step for separation of a $C_{3+}$ hydrocarbon fraction and a lighter hydrocarbon fraction from the condensed portion.

16. The process of claim 15, wherein the selectivity exhibited in step (e) is at least about 3.

17. The process of claim 15, wherein the cooling does not lower the temperature of the first feed stream below $0°$ C.

18. The process of claim 15, further comprising cooling the first residue stream prior to passing the first residue stream across the second feed side.

19. The process of claim 15, wherein the lighter hydrocarbon fraction is recirculated to the cooling step.

20. The process of claim 15, wherein the first permeate stream is recirculated to the cooling step.

* * * * *